Figure 2A:
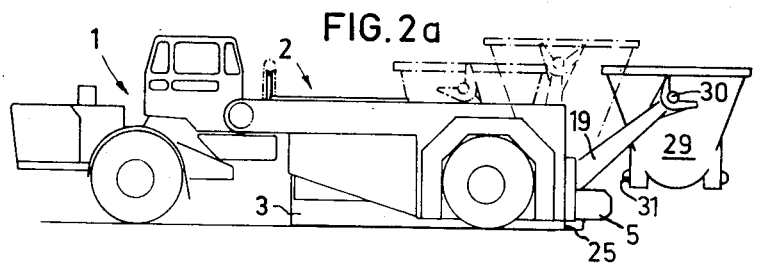

United States Patent [19]

Sjostrom et al.

[11] 3,722,720
[45] Mar. 27, 1973

[54] A CONTAINER HANDLING DEVICE FOR YOKE-END TRUCKS OR THE LIKE

[75] Inventors: John Olov Hilding Sjostrom, Hoglandssjon; Lars Erik Sundkvist, Gullanget, both of Sweden

[73] Assignee: AB Hagglund & Soner, Ornskoldsvik, Sweden

[22] Filed: Feb. 4, 1971

[21] Appl. No.: 112,546

[30] Foreign Application Priority Data

Feb. 12, 1970 Sweden..................................1806/70

[52] U.S. Cl..................................................214/317
[51] Int. Cl..............................................B65g 65/00
[58] Field of Search.......214/312, 313, 314, 315, 317

[56] References Cited

UNITED STATES PATENTS 3,446,378  5/1969  Miller.....................................214/317
2,860,798  11/1958  Van Hellen.............................214/130
3,472,404  10/1969  Ord.........................................294/113
1,629,184  5/1927  Thomas..................................222/166

FOREIGN PATENTS OR APPLICATIONS 1,325,088  3/1963  France...................................214/315

Primary Examiner—Robert G. Sheridan
Assistant Examiner—Lawrence J. Oresky
Attorney—Cushman, Darby & Cushman

[57] ABSTRACT

The present invention relates to an auxiliary aggregate a container handling device for yoke-end trucks or similar vehicles having vertically adjustable, essentially horizontal lifting means. The handling device is designed to lift, carry and dump, by tipping, heavy containers, preferably slag ladles or the like. The handling device shall be of such a type that it can be supported by the lift beams of the truck and can be easily set down in a storage area when it is not required for use so that the truck can be used for other transporting purposes.

10 Claims, 7 Drawing Figures

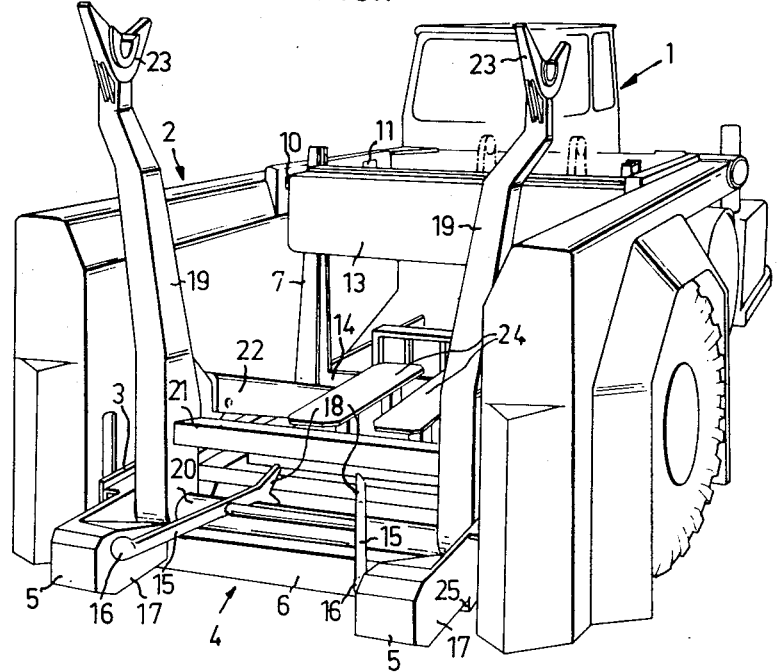

A CONTAINER HANDLING DEVICE FOR YOKE-END TRUCKS OR THE LIKE

The present invention relates to an auxiliary aggregate or container handling device for yoke-end trucks or similar vehicles having vertically adjustable, essentially horizontal lifting means. This aggregate or handling device is designated to lift, carry and dump, by tipping, heavy containers, preferably slag ladles or the like. By the terms "auxiliary aggregate" and "aggregate" used in the specification and claims, it is meant to define "a container handling device" or "handling device", respectively.

In recent years, yoke-end trucks have been shown to be particularly suitable for the internal transport in steel works and have therefore increasingly begun to replace previously used railbound vehicles and straddle trucks. They excel, inter alia, in their ability to utilize different types of goods carriers and because of their special structure where the cab is placed at a distance from the load, they can be used for transporting hot articles.

However, for transporting and emptying of slag ladles and similar heavy containers in the 30 ton range, special vehicles are used that are especially constructed for this purpose since the lift beams of the yoke-end truck are not suitable for handling such containers. These special vehicles are expensive and complicated and are often standing idle because they cannot be used for other purposes. Particularly with regard to the transport of slag ladles, no more than about five loads per day need normally be hauled. This means that the vehicle cannot be fully utilized. During service and repair, the vehicle is not available for use for long periods, thus resulting in additional problems.

The object of the present invention is to produce an auxiliary aggregate specially designed for yoke-end trucks, so that the aggregate can make possible the utilization of such trucks for hauling and dumping slag ladles in particular. The auxiliary aggregate shall be of such a kind that it can be supported by the lift beams of the truck and easily set down in a storage area when it is not required for use, so that the truck can be used for other transporting purposes.

This is achieved according to the invention by having a frame which is supportable by the truck's lift beams and displaceable, in the longitudinal direction of the lift beams, between an advanced carrying- or transporting position and a rear lifting or dumping position, in which positions the frame can be locked by locking means provided on said frame. The locking means are designed to engage co-operating means on the truck whereby lifting arms are located in the rear section of the frame. These arms are journalled in their lower ends for swingable movement between a backward swung lifting- respectively dumping position and a forward swung carrying- or transporting position. The upper ends of the arms are arranged to engage the container or ladle at its upper edge and carry it between a position behind the frame and a bed situated on the frame in front of the journalling of the lifting arms. Tilting arms are so pivotably journalled in the frame that, after a limited movement of the lifting arms and the container in a direction away from the bed toward a position behind the frame, they are swingable from an idle position to engagement with the lower section of the container so that with continued rearward movement of the lifting arms, said tilting arms gradually stop the movement of the lower section of the container and occasion tipping of said container.

By applying the invention, an aggregate is obtained which additionally increases the flexibility of the yoke-end truck and eliminates the need of special vehicles for handling slag ladles and similar containers. Displacement of the aggregate between a forward transporting position and a rear lifting position results in particular advantages, inter alia with regard to the load distribution. This will be clearly revealed further on in the description. Since the aggregate can be put aside when it is not required for use, or when it is being repaired or serviced, the truck can be fully utilized for other haulage purposes. Similarly, when the truck is being repaired, the aggregate can be carried by another truck.

In order to facilitate placement of the truck's lift beams under the frame of the aggregate when the frame rests on a level surface, e.g., the ground, said frame is shaped on its underside to have a grip for the lift beams. This grip can consist of a step provided on the underside of each of the longitudinal outer sections of the frame. In this way, the truck can also be partially unloaded by lowering the lift beams so that the aggregate rests entirely on the ground when a ladle is lifted or dumped. The truck is then subjected only to the torque which is transferred to it via the locking means of the aggregate.

In a preferred embodiment of the aggregate according to the invention, the underside of the frame is shaped, somewhat in front of its back end, with vertical surfaces which serve to form a stop against a check beam or the like on a slag pile. The driver can then back the truck with the aggregate in a rearward dumping position until the stop contacts the check beam. This facilitates the maneuvering since the driver's visibility is quite limited. In this position, the rear part of the frame juts out over the dumping site.

It is preferable to arrange vertically resiliently supported rollers in front of the vertical surfaces which form the stop. When the truck, with the aggregate in a lowered and rearward lifting position, is backed up to the ladle, these rollers will roll along the ground and lessen the friction while they will be upwardly displaced, so that the frame sinks and rests against the ground when the lifting arms grab and lift in the lifting pins of the ladle. These rollers also allow for a certain lateral sloping of the frame and the lifting arms so that when a somewhat slanting ladle is gripped, one lifting arm first grips one pin of the ladle whereafter the roller on the corresponding side presses upward in relation to the frame when that side of the frame presses against the level ground, and the other lifting arm is made to grip the other pin. In this way, lopsided loading of the lifting arms which could cause damage to the aggregate is avoided.

The locking means for locking the aggregate in the different positions on the truck can be advantageously constituted of hydraulically controlled spring bolts which can be inserted into openings in the truck's yoke and correspond to the supporting- or transporting position and the lifting or dumping position. If there is a certain play between the bolts and the openings, a limited tipping of the aggregate is allowed without the lock being released.

In a preferred embodiment, the aggregate's lifting arms and tilting arms are swingable by means of hydraulic cylinders which are connectible to the hydraulic system of the truck. Automatic coupling is preferably used so that the hydraulic means of the aggregate can either manually or automatically be quickly and easily linked up with the truck's hydraulic system.

For safety's sake, the spring bolts can be arranged to control electric switches, which are connectible to the truck's control circuit for the hydraulic cylinders of the lifting arms, so that the maneuvering of the lifting arms is possible only when the spring bolts are in their locking position. In this way, a safety catch is obtained which prevents movement of the lifting arms before the aggregate is secured at the yoke. In any other case, the aggregate would tip over when a filled slag ladle was being lifted. Such an occurence could damage material and injure people.

The tilting arms are preferably journalled at one of their ends in journalling points which are located behind the journalling points for the lifting arms. In this way, a particularly advantageous tipping movement of the ladle is obtained since said ladle is held in vertical position over a greater part of its path of movement in a direction away from the bed, and the actual tipping movement first begins when the back edge of the ladle is behind the aggregate. It is hereby suitable if the tilting arms have a substantially horizontal resting position, in order to be completely out of the way when they are idle, e.g., when the ladle is being lifted. The free ends of the tilting arms can be Y-shaped to mesh, when in a position raised from the idle position during dumping, with a cross beam in the bottom section on the ladle.

In certain cases, it may be desireable to be able to move the aggregate from one site to another without needing to connect it to the truck's hydraulic system for control of the spring bolts. When transporting the aggregate on a plane surface, hardly any locking is required for securing the aggregate on the lift beams. However, e.g., when going up a hill, particularly if the lift beams are covered with ice or snow, some form of locking is required. This is easily solved by providing the front end of the aggregate's frame with a transverse vertical plate or beam over which the ordinary locking hook of the truck can grip — i.e., the locking hook which is designed to keep conventional load carriers in position when the lift beams are tipped as is shown in U. S. Pat. No. 3,520,429.

Figure 2B:
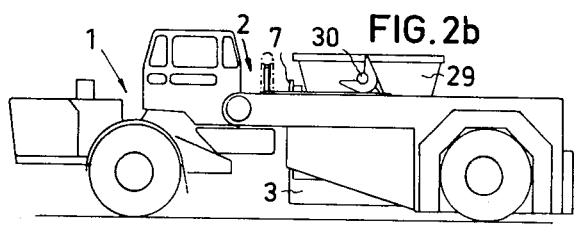
Figure 2C:
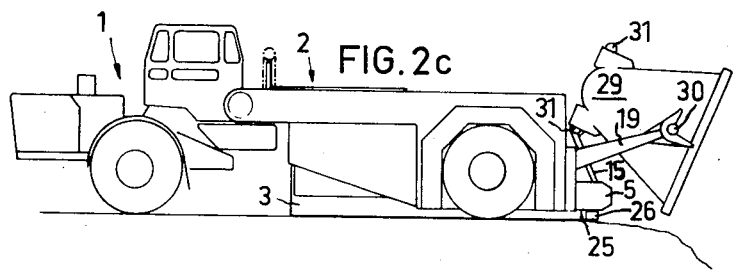
Figure 4:
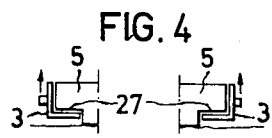
Figure 3:
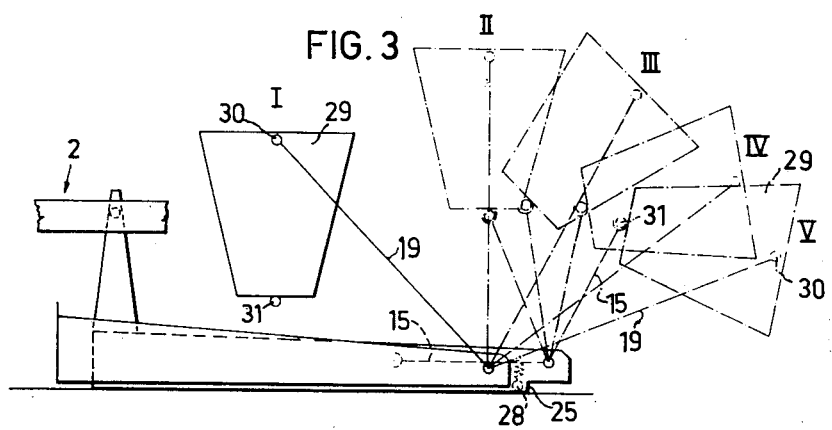

The invention will now be more closely described with reference to the enclosed drawings illustrating embodiments. FIG. 1 shows a rear, perspective view of a yoke-end truck having an auxiliary aggregate according to the invention placed on the lift beams. FIG. 1b is a schematic detailed picture of the locking of the aggregate. FIGS. 2a – 2c are schematic side views of a yoke-end truck having an auxiliary aggregate, showing the different positions of the ladle during lifting, transporting and dumping. FIG. 3 is a schematic side view of the auxiliary aggregate illustrating the co-operation between the tilting- and lifting arms during dumping. FIG. 4 is a schematic rear view of the frame illustrating the grip for the lift beams.

In FIG. 1, the illustrated yoke-end truck consists of a one-axled tractor unit 1 which is coupled together with the load carrying unit, i.e., the yoke 2. In the yoke, the lift beams 3 are vertically adjustably respectively tiltably journalled in an ordinary manner. The lift beams 3 support the auxiliary aggregate, generally represented by 4 in a manner as described in the aforenoted U. S. patent.

The auxiliary aggregate 4 consists of a supporting frame construction that is formed by two longitudinal frame side members 5 which are situated at a distance from each other, are box-shaped at their back parts and are interconnected by a number of transverse beams, one of which is shown as 6. The frame side members 5 are connected at their front ends with respective vertical beams 7. These beams are provided in the vicinity of their upper ends with respective openings 8 (FIG. 1b) through which a spring bolt 9 extends. This spring bolt can be brought, by means of a hydraulic cylinder 12, to enter into one of two openings 10 and 11 in each side of the yoke 2 of the truck. The hydraulic cylinders 12 are enclosed in a housing 13 which runs between the beams 7 and connects same with each other. In addition, the beams 7 are interconnected at their lower sections by means of a vertical plate 14 over which the ordinary locking hook (not shown) of the truck can grip to serve as a transport safety catch.

In the back, box-shaped section 17 of the frame side members 5 are two interconnected tilting arms 15 swingably journalled at one of their ends 16. In FIG. 1, the tilting arms 15 are shown in their horizontal, idle position. In the box-shaped section 17 is a hydraulic cylinder (not shown) by which the tilting arms can be swung so that their operative, Y-shaped ends 18 can be brought to interlock with a transverse beam 31 in the bottom section of the ladle. This will be further described below. Somewhat in front of the journalling of the tilting arms 15 are two well-dimensioned lifting arms 19 which are swingably journalled in their lower ends. The lifting arms 19 are connected with a sleeve 20 which is mounted on a shaft that extends between the frame side members 5. In addition, the lifting arms are interconnected by means of a cross beam 21. Each lifting arm 19 is operated by a powerful hydraulic cylinder which, in FIG. 1, is shown encased in a guard 22. The upper ends 23 of the lifting arms are so shaped that they can grip the lifting pins of the slag ladle. In front of the journalling of said lifting arms 19 is a bed 24 on which the ladle is designed to be placed by the lifting arms 19.

The back, box-shaped sections 17 of the frame side members 5 are somewhat raised in relation to the remaining part of the side members so that a vertical surface 25 is formed which can serve as a stop when the truck is backed up to a check beam 26. This is most clearly revealed by FIG. 2c. As shown in FIG. 4, the frame side members 5 are also shaped to form a grip 27, so that the lift beams 3 can be inserted under the frame side members when the aggregate is resting on a level surface, e.g., the ground. In addition, each frame side member 5 has a roller 28 (FIG. 3) which is resiliently arranged in front of the stop 25 and which is operative, when the handling device is loaded so that the side member 5 exerts a force sufficient to overcome the resilient bias of the rollers and thereby rest entirely on the ground.

The operating method of the auxiliary aggregate 4 with regard to a yoke-end truck is as follows. The aggregate is taken from the storage area by the truck in the following manner. The truck is backed up to the aggregate with the lift beams 3 in a lowered position. The lift beams slide into the grip 27 on the frame side members 5. The truck is backed up until the frame beams 7 are level with the position marked in FIG. 1 with I. The lift beams are then raised until the spring bolts 9 can be inserted into the openings 11 in the yoke 2. The aggregate is now secured in the transporting position. It is presumed here that the hydraulic system of the aggregate is connected with the truck before the spring bolts 9 are brought into engagement. In another case, e.g., if one wished only to move the aggregate to another storage area, the aggregate can be secured for transport by moving the ordinary locking hook of the truck down over the upper edge of the plate 14.

With the aggregate in the transporting position, the truck is driven to collect the slag ladle 29 (FIG. 2a). In the vicinity of the ladle, the aggregate is lowered to the ground with the help of the lift beams 3; the locking in position I has first been released. With the aggregate resting on the ground, the truck is driven so far forward that the frame beams 7 become level with the position indicated in FIG. 1 by II. At this position, the spring bolts 9 can be inserted into the openings 10 and secure the aggregate in the so-called lifting or tipping position. At this point, the lifting arms 19 are swung backwards (see FIG. 2a) simultaneous with the backing up of the truck to the ladle 29. The aggregate then slides along the ground whereby the rollers 28 contribute to the lessening of the friction. The lift beams can possibly be tilted forward somewhat so that the back part of the frame side members is raised somewhat above the ground in order to further decrease the friction. As was previously mentioned, this presupposes a certain play between the spring bolts 9 and the openings 10 if the lift beams 3 are tipped somewhat, i.e., so that their position deviates from the horizontal plane, the upper parts of the vertical beam 7 which supports the spring bolts 9, will be displaced somewhat relative to the side sections of the truck in which the openings are made. The purpose of the play is to make it possible to maintain the connection 9 and 10 during a small tipping of the lift beams 3. When the upper ends 23 of the lifting arms 19 have been brought into engagement with the lifting pins 30 of the ladle 29, the lifting arms are swung rearwardly to begin the lifting of the ladle 29. Because of the heavy load which is occasioned here by the heavy weight (up to 30 tons) of the filled ladle, the back end of the frame is forced down against the ground so that the rollers press into the frame side members 5 and the frame side resting upon the ground. With the aggregate resting on the ground, the lifting arms 19 are swung forward with the help of the hydraulic cylinders and place the ladle on the bed 24. Because the aggregate rests on the ground during this work period, the truck is subjected to only that load which is transferred by the torque from the spring bolts 9 to the yoke 2. In any other case, the rear axle pressure would be unacceptably high. The ladle 29 is now in the more forward of the positions shown in FIG. 2a. The locking in position II (FIG. 1) is then released and the truck is backed up so that the aggregate comes into the transporting position (position I). The aggregate is thereafter lifted by the lift beams 3 and the spring bolts are inserted into the openings 11. Because the openings 11 have an oval or continuous (not shown) vertical form, locking can occur before the aggregate is lifted, whereby the volts 9 are upwardly displaced in the openings 11 when lifting begins. The forward movement of the aggregate before transporting results in better weight distribution between the two axles of the truck than if the aggregate had been left in the rear lifting position.

After arrival at the dumping site, the lift beams 3 are lowered so that the aggregate 4 rests at ground level. The spring bolts 9 are released from the openings 11 in position I and the truck is then driven forward until the aggregate reaches the tipping position (position II), which is the same as the lifting position. The aggregate 4 is then lifted somewhat and the truck is backed up to the dumping position — i.e., until the stop 25 comes into contact with the check beam 26 on the dumping site (see FIG. 2b). The lift beams 3 are lowered so that the aggregate rests on the ground. Locking then takes place as the spring bolts are inserted into the openings 10. The aggregate 4 is now ready for the dumping of the ladle 29. In order to produce the tipping motion, the tilting arms are hydraulically swung to such a height that their Y-shaped ends, after a limited rearward movement of the lifting arms, interlock with a tubular beam 31 on the underside of the ladle. Y-shaped ends 18 of the arms 15 are brought into engagement with the support 31 of the ladle by means of the hydraulic cylinders (not shown) which are disposed in the box-shaped sections of the beams 5. These hydraulic cylinders are arranged and constructed so as to effectuate the desired movement of the arms 15. With the continued motion of the lifting arms 19, the tilting arms 15 will successively restrict the movement of the bottom part of the ladle 29, while the upper part continues to move rearwards and downwards so that the ladle is tipped (see FIGS. 2c and 3). During the dumping, the tilting arms 15 absorb a part of the load and thereby help to relieve the pressure on the lifting arms 19. Whereas the lifting arms require exceedingly strong hydraulic cylinders for their maneuvering, the tilting arms require only a relatively weak hydraulic cylinder which can swing said tilting arms to the tipping position. After the dumping has been completed, the truck is driven forward a short distance. The aggregate is then returned to the transporting position (position I) in the same way as described above.

Since the aggregate can be moved to a rear tipping position, the rear wheels of the truck will not be so close to the edge of the slag pile where the surface can easily give way because of the high axle pressure. Another advantage is that the hot slag, when being dumped, is nowhere near the driver.

What we claim is:

1. Auxiliary aggregate for yoke-end trucks or similar goods vehicles having vertically adjustable, essentially horizontal lifting means designed to lift, carry and empty, by dumping, heavy containers, preferably slag ladles or the like, comprised of a frame, supportable by the truck's lift beams and displaceable in the longitudinal direction of the lift beams between an advanced carrying position and a rearward lifting position, in which positions the frame is prevented from tipping relative to the lift beams by means co-operating with the truck, swingable lifting arms situated in the back section of the frame, said lifting arms being journalled in their lower ends and being swingable between a tipping position and a forward swung carrying position and whose upper ends are arranged to engage the container at its upper section and move it between a position behind the frame and a bed situated on the frame in front of the journalling of the lifting arms, and tilting arms being pivotably journalled in said frame so that, after a limited movement of said lifting arms and the container away from the bed towards a position behind the frame, they are swingable from an idle position to engagement with the lower section of the container in order to gradually restrict the movement of said lower section of the container, during the continued rearward movement of said lifting arms, and occasion tipping of the container.

2. Aggregate according to claim 1, wherein the underside of the frame is a grip for the lift beams so that the beams can be inserted under the frame when the frame rests on a level surface such as the ground.

3. Aggregate according to claim 1, wherein the underside of the frame is, somewhat in front of the truck's back end, shaped to form vertical surfaces which serve to form a stop against a check beam or the like on a slag pile.

4. Aggregate according to claim 3, wherein vertically resiliently supported rollers are arranged in front of said vertical surfaces which form said stop.

5. Aggregate according to claim 1, wherein the means co-operating with the truck consists of hydraulically operated spring bolts which are insertable in openings in the yoke of the truck, said openings corresponding to the carrying position and the lifting and tipping position.

6. Aggregate according to claim 1, wherein the lifting arms and the tilting arms are controlled by means of hydraulic cylinders in communication with the hydraulic system of the truck.

7. Aggregate according to claim 5, wherein the spring bolts are arranged to control electric switches, which are connected to the truck's control circuit for the hydraulic cylinders of the lifting arms so that maneuvering of said lifting arms is possible only when said spring bolts are in their locking position.

8. Aggregate according to claim 1, wherein the tilting arms are journalled at one of their ends in journalling points which are located behind the journalling points of the lifting arms, and that the tilting arms have an essentially horizontal idle position, in which position their free ends are in front of the journalling points of said lifting arms.

9. Aggregate according to claim 8, wherein the free ends of the tilting arms are Y-shaped in order to engage, in the tipping operation, a cross beam at the bottom section on a slag ladle.

10. Aggregate according to claim 1, wherein the front end of said frame is provided with a transverse vertical plate or beam for engagement with a locking hook on the truck.

* * * * *